United States Patent
Hladik

(10) Patent No.: US 10,519,333 B2
(45) Date of Patent: Dec. 31, 2019

(54) MULTIFUNCTIONAL ALCOHOL DISPERSIONS OF CARBON NANOTUBES

(71) Applicant: Brewer Science Inc., Rolla, MO (US)

(72) Inventor: Molly Hladik, Rolla, MO (US)

(73) Assignee: Brewer Science, Inc., Rolla, MO (US)

(*) Notice: Subject to any disclaimer, the term of this patent is extended or adjusted under 35 U.S.C. 154(b) by 1568 days.

(21) Appl. No.: 13/870,497

(22) Filed: Apr. 25, 2013

(65) Prior Publication Data

US 2013/0288064 A1    Oct. 31, 2013

Related U.S. Application Data

(60) Provisional application No. 61/638,928, filed on Apr. 26, 2012.

(51) Int. Cl.
    *C09D 11/00*    (2014.01)
    *C09D 11/52*    (2014.01)

(52) U.S. Cl.
    CPC ....... *C09D 11/52* (2013.01); *Y10T 428/31786* (2015.04); *Y10T 428/31993* (2015.04)

(58) Field of Classification Search
    CPC ......... C09D 11/52; B82Y 30/00; B82Y 40/00; D04H 1/4242; C01B 31/0273; Y10T 428/31786; Y10T 428/31993
    See application file for complete search history.

(56) References Cited

U.S. PATENT DOCUMENTS

| | | |
|---|---|---|
| 7,754,328 B2 | 7/2010 | Chokai et al. |
| 8,257,677 B2 | 9/2012 | Berkei et al. |
| 2004/0055892 A1 | 3/2004 | Oh et al. |
| 2005/0276924 A1 | 12/2005 | Bielek et al. |
| 2007/0078215 A1 | 4/2007 | Yoon et al. |
| 2007/0278481 A1* | 12/2007 | Lee et al. .................. 257/40 |
| 2008/0103329 A1 | 5/2008 | Hirakata et al. |
| 2008/0135815 A1 | 6/2008 | Glatkowski et al. |
| 2010/0137528 A1 | 6/2010 | Sample et al. |
| 2010/0187485 A1 | 7/2010 | Kitano |
| 2011/0003907 A1 | 1/2011 | Choi et al. |
| 2011/0081546 A1 | 4/2011 | Kim et al. |
| 2012/0326093 A1 | 12/2012 | Landorf |

FOREIGN PATENT DOCUMENTS

| | | |
|---|---|---|
| CA | 2 787 073 A1 | 7/2011 |
| CN | 1961102 | 5/2007 |
| CN | 101368089 | 2/2009 |
| CN | 101578237 | 11/2009 |
| CN | 101780379 | 7/2010 |
| CN | 102046517 | 5/2011 |
| EP | 1 609 756 | 12/2005 |
| JP | 2003-308734 | 10/2003 |
| JP | 2006-008861 | 1/2006 |
| JP | 2006-069848 | 3/2006 |
| JP | 2007-207568 | 8/2007 |
| JP | 2008-081384 | 4/2008 |
| JP | 2010-163568 | 7/2010 |
| JP | 2010-270205 | 12/2010 |
| JP | 2012-62412 | 3/2012 |
| KR | 10-0847987 | 7/2008 |
| TW | 200427740 | 12/2004 |

OTHER PUBLICATIONS http://www.collinsdictionary.com/dictionary/english/surfactant (2016).*
http://www.thefreedictionary.com/dispersant (2016).*
English Abstract of CN101780379, 1 page.
Machine Translation in English of JP2012-62412, 20 pages.
International Search Report dated Aug. 12, 2013 in corresponding PCT/US2013/038195, filed on Apr. 25, 2013.
International Preliminary Report on Patentability dated Nov. 6, 2014 in corresponding PCT/US2013/038195, filed on Apr. 25, 2013.
Machine Translation in English of JP2010-270205, 19 pages.
Machine Translation in English of JP2006-069848, 22 pages.
Machine Translation in English of JP2003-308734, 8 pages.
Machine Translation in English of JP2010-163568, 25 pages.

* cited by examiner

*Primary Examiner* — Samir Shah
(74) *Attorney, Agent, or Firm* — Hovey Williams LLP

(57) ABSTRACT

New carbon nanotube (CNT) compositions and methods of using those compositions are provided. Raw carbon nanotubes are mechanically dispersed via milling into multifunctional alcohols and mixtures of multifunctional alcohols and solvents to form pastes or dispersions that are viscous enough to be printed using standard means such as screen printing. These pastes or dispersions are stable in both dilute and concentrated solution. The invention allows films to be formed on substrates (e.g., plastics, glass, metals, ceramics).

24 Claims, No Drawings

MULTIFUNCTIONAL ALCOHOL DISPERSIONS OF CARBON NANOTUBES

RELATED APPLICATIONS

This application claims the priority benefit of a provisional application entitled MULTIFUNCTIONAL ALCOHOL DISPERSONS OF CARBON NANOTUBES, Ser. No. 61/638,928, filed Apr. 26, 2012, incorporated by reference herein.

FEDERALLY SPONSORED RESEARCH OR DEVELOPMENT

This invention was made with government support under contract number 70NANB10H001 awarded by The National Institute of Standards and Technology's Technology Innovation Program. The United States Government has certain rights in the invention.

BACKGROUND OF THE INVENTION

Field of the Invention

The present invention is concerned with inks for carrying carbon nanotubes for printing of conductive traces.

Description of the Prior Art

Carbon nanotube (CNT) coatings need to be applied by a variety of methods. Many printing techniques require viscous coatings, which necessitate that the CNTs be dispersed into some sort of medium. For example, screen printing requires a very high viscosity that is not easily achieved with the typical methods of dispersion for CNTs. Once the CNT coating has been printed, the medium carrying the CNTs has to be removable so that the unique optical and electronic properties of the CNTs are not diminished.

Formulations have been created using a low viscosity surfactant dispersion to apply the CNTs (via spray or rod drawdowns) to get the final desired properties. This method, however, requires a post-application step of washing the film to remove the surfactant so that the CNT properties are not diminished.

Another similar technology is the V2V™ process from Chasm Technologies, Inc. (Bielek, 2005). The V2V process is a process of dispersing the CNTs in a low viscosity medium (acid or amine solvents). Once the CNTs are sufficiently dispersed, $CO_2$ is bubbled through the sample to create an acid-amine adduct using hydrogen bonding properties. This process allows the dispersing media to become viscous until heated, and then when heated, the solvents volatilize rapidly, leaving only the CNTs behind. However, this method does not generate long term stability. The acid-amine adduct made by the $CO_2$ will degrade at room temperature, causing the viscosity to decrease with time. The adduct can be reformed by bubbling $CO_2$ back through the sample, but this property necessitates onsite manufacturing, and the product must be used immediately after manufacture.

Similar fugitive viscosity modifiers include the use of solid ammonium acid salts as a viscosity modifier for organic bases. Ammonium carbonate is a salt composed of water, carbon dioxide, and ammonia. When a molecule that is sufficiently basic reacts with the ammonium carbonate or ammonium carbamate salt, it will displace the ammonia. If the molecule is dibasic, then a hydrogen bonded carbonic acid polymer chain can form. Since the fluid is then composed of long molecular chains, its viscosity will be increased dramatically. The hydrogen bonded polymer will decompose at a low temperature. The use of a solid reagent (ammonium carbonate) is simpler than the use of gaseous $CO_2$ in the V2V™ process.

For transparent conductive applications, it is ideal that the carriers completely removable. Otherwise, residues may interfere with the transparency or conductivity of the traces. Many flexible substrates cannot tolerate high temperatures during post-processing, so it is important that the carrier can be easily removed at low temperatures.

SUMMARY OF THE INVENTION

The present invention broadly overcomes the problems of the prior art by providing a dispersion comprising carbon nanotubes mixed with an alcohol. The dispersion comprises less than about 0.5% by weight surfactants, based upon the total weight of the dispersion taken as 100% by weight.

The invention also provides a method of preparing a carbon nanotube film, where the method comprises providing a dispersion comprising carbon nanotubes mixed with an alcohol. Again, the dispersion comprises less than about 0.5% by weight surfactants, based upon the total weight of the dispersion taken as 100% by weight. That dispersion is then formed into a film.

DETAILED DESCRIPTION OF THE PREFERRED EMBODIMENTS

CNTs for Use in the Present Invention

The present invention comprises mixing CNTs with an alcohol, and possibly a solvent, to form a solution/dispersion (although in some embodiments viscous enough to be characterized as a paste) that can then be formed into a film by any conventional method of forming CNT films.

Suitable CNTs for use in the present inventive method include any raw single-walled, double-walled, or multi-walled CNTs (SWCNTs, DWCNTs, and MWCNTs, respectively). Preferably, the CNTs are pristine, that is, CNTs having little or no sidewall defects, existing functionalization, or doping. Exemplary types of CNTs for this process include, but are not limited to, CG200 CNTs and SG65 CNTs (available from SWeNT), XBC3350 CNTs (available from CCNI), HiPco™ CNTs (available from NanoIntegris), as well as those available from Thomas Swan and CheapTubes. The CNTs are preferably included at levels of from about 0.01% by weight to about 5% by weight, and preferably from about 0.07% to about 2% by weight, based upon the total weight of the dispersion taken as 100% by weight. This concentration will depend upon the transparency and conductivity desired in the final film.

In one embodiment, the CNTs are utilized are functionalized. One exemplary type of functionalization is functionalizing the CNTs with aromatic moieties, such as pyrene, as described in U.S. Patent Application Publication No. 2012/0326093, incorporated by reference herein. Such solutions can be formed by reacting CNTs, polyaromatic moieties (provided as part of a compound comprising at least one polyaromatic moiety), and an acid. The CNTs can first be added to the acid for breaking apart the CNTs that may be bundled or clustered together, followed by addition of the compound comprising at least one polyaromatic moiety. Alternatively, the compound comprising at least one polyaromatic moiety can be combined with the acid, followed by addition of the CNTs. As a further alternative, the compound comprising at least one polyaromatic moiety and CNTs could first be combined, followed by addition of the acid.

Suitable compounds comprising at least one polyaromatic moiety for use in the inventive method include any unsubstituted or substituted polyaromatics that possess a physical and electronic structure allowing them to be non-covalently bonded to the surface of the CNTs. Preferably, the polyaromatic moieties are planar or have a large planar area and contain carbon ranges from about $C_{10}$ to about $C_{100}$, more preferably from about $C_{12}$ to about $C_{30}$, and even more preferably from about $C_{16}$ to about $C_{20}$. Exemplary polyaromatic compounds include substituted (at any position) and unsubstituted versions of compounds selected from the group consisting of naphthalene, anthracene, phenanthracene, pyrene, tetracene, tetraphene, chrysene, triphenylene, pentacene, pentaphene, perylene, benzo[a]pyrene, coronene, antanthrene, corannulene, ovalene, graphene, fullerene, cycloparaphenylene, polyparaphenylene, cyclophene, and similar molecules, as well as compounds containing moieties of the foregoing. Exemplary substituted polyaromatic compounds include those selected from the group consisting of 1-pyrenebutyric acid, 1-pyrenemethylamine hydrochloride, rubrene, pyrene, and triphenylene.

In this embodiment, the CNTs and compound comprising at least one polyaromatic moiety are preferably utilized in the inventive method at levels such that the molar ratio of CNTs to polyaromatic moieties is from about 25:75 to about 75:25, preferably from about 35:65 to about 65:35, more preferably from about 45:55 to about 55:45, and even more preferably about 50:50.

Alcohols for Use in the Present Invention

Suitable alcohols for use in the present invention include any that alcohol that allows the final dispersion to be printed by conventional means and that will volatilize at a suitably low temperature. Preferred such alcohols are multifunctional, with diols, triols, and mixtures thereof being particularly preferred. Preferably, the alcohol will be a $C_2$-$C_6$ alcohol, and more preferably a $C_2$-$C_3$ alcohol. Exemplary alcohols include those selected from the group consisting of 2-methyl-1,3-propanediol, 1,2-propanediol, 1,3-propanediol, glycerol, and ethylene glycol.

Preferably, the selected alcohol or alcohol system is liquid at room temperature and has a boiling point of from about 35° C. to about 300° C., and more preferably from about 60° C. to about 200° C. The alcohol or mixture of alcohols is preferably included at levels of from about 90% by weight to about 99.999% by weight, more preferably from about 95% by weight to about 99.99% by weight, and even more preferably from about 98% by weight to about 99.95% by weight, based upon the total weight of the dispersion taken as 100% by weight.

Other Ingredients Used or Omitted

The alcohol or alcohol mixture can function as the only solvent system, or other solvents may be blended in to obtain the desired properties (e.g., wetting, surface tension, volatilization, viscosity or flow). Some solvents that could be blended in include those selected from the group consisting of ethers and monofunctional alcohols. In situations where a solvent other than an alcohol is used, the amount of that other solvent is preferably included at levels of from about 0.01% by weight to about 20% by weight, and preferably from about 1% by weight to about 10% by weight, based upon the total weight of the dispersion taken as 100% by weight.

In one embodiment, the dispersions will be free of other ingredients, such as surfactants, dispersants, amino acids, polymers, catalysts, metals, and impurities. In such instances, the dispersions will comprise less than about 0.5% by weight, more preferably less than about 0.1% by weight, and more preferably about 0% by weight of one or more of these other ingredients, based upon the total weight of dispersion taken as 100% by weight. In a further embodiment, the dispersion consists essentially of and preferably consists of, carbon nanotubes, the alcohol, and optionally any other solvent utilized.

Formation and Use of Inventive Dispersions

The inventive dispersions or dispersions are prepared by mixing together the above ingredients. Suitable mixing methods include milling techniques such as 3-roll milling or ball milling. The prepared dispersion will preferably have a Brookfield viscosity for low-viscosity materials, or a cone and plate viscosity for high-viscosity materials, at 25° C. of from about 1 cP to about 200,000 cP, preferably from about 5 cP to about 100,000 cP, and more preferably from about 10 cP to about 50,000 cP. The resulting dispersions are shelf-stable (i.e., no observable bundling) for at least about 2 weeks, preferably at least about 3 months, and more preferably at least about 6 months.

The dispersions can be used to formulate inks to print highly conductive traces for printed electronic applications. Films can be formed from the dispersions or inks using known methods (e.g., including as inkjet, screen, flexographic, or gravure printing, spin and spray coating, roll-to-roll, slot die). The film will typically be formed on a substrate such as those selected from the group consisting of polyethylene terephthalate, polyimide, FR-4, breadboard, poly(methyl methacrylate), polyacrylate, epoxy, polyurethane, paper, polyester, and polyethylene, silicon, SiGe, $SiO_2$, $Si_3N_4$, aluminum, tungsten, tungsten silicide, gallium arsenide, germanium, tantalum, tantalum nitride, coral, black diamond, sapphire, phosphorous or boron doped glass, ion implant layers, titanium nitride, hafnium oxide, silicon oxynitride, and mixtures of the foregoing.

Post-processing of the compositions involves heating the deposited material, such as by heating in a convection dryer, utilizing IR heat, heating on the printing platen itself, and/or a combination thereof. When heat is used, it should be heated to a temperature at or above the flash point of the solvents in the material for a sufficient amount of time to remove the solvents (i.e., typically at a temperature of from about 50° C. to about 450° C., and preferably from about 75° C. to about 450° C., and for a time period of from about 10 seconds to about 10 hours, and preferably from about 20 seconds to about 5 minutes, depending upon substrate and alcohol systems).

The resulting films have high conductivities (i.e., low sheet resistances). More particularly, the sheet resistance will be less than about 7,000 Ω/sq at 85% T, preferably less than about 2,000 Ω/sq at 85% T, and more preferably from about 300 Ω/sq to about 600Ω at 85% T. Additionally, with the inventive method, there is no need for a wash step after the coating has been deposited. The above properties allow the inventive dispersions and films to be useful in numerous electronic devices, including interconnects, integrated circuits, microelectronics, optoelectronics, photoelectronics, microelectromechanical systems (MEMS), photovoltaics, sensors, and LEDs.

EXAMPLES

The following examples set forth preferred methods in accordance with the invention. It is to be understood, however, that these examples are provided by way of illustration and nothing therein should be taken as a limitation upon the overall scope of the invention.

Example 1

CG300X in 2-Methyl-1,3-Propanediol

In this procedure, 0.25 grams of CG300X CNTs (SWeNT, Norman, Okla.) were mixed with 49.75 grams of 2-methyl-1,3-propanediol (Aldrich, St. Louis, Mo.). The CNTs were wetted with the solvent and placed in an Exact 3-roll mill as a paste. The remainder of the solvent was added while the milling process occurred in order to further dilute and disperse the solution.

Example 2

CG300X in 1,2-Propanediol

In this Example, 0.25 grams of CG300X CNTs were mixed with 49.75 grams of 1,2-propanediol (Aldrich, St. Louis, Mo.). The CNTs were wetted with the solvent and placed in an Exact 3-roll mill as a paste. The remainder of the solvent was added while the milling process occurred in order to further dilute and disperse the solution.

Example 3

CG300X in 1,2-Propanediol

In this procedure, 0.4 grams of CG300X CNTs were mixed with 99.6 grams of 1,2-propanediol. The CNTs were wetted with the solvent and placed in an Exact 3-roll mill as a paste. The remainder of the solvent was added while the milling process occurred in order to further dilute and disperse the solution.

Example 4

CG300X in 1,3-Propanediol

In this Example, 0.25 grams of CG300X CNTs were mixed with 49.75 grams of 1,3-propanediol (Aldrich, St. Louis, Mo.). The CNTs were wetted with the solvent and placed in a Exact 3 roll mill as a paste. The remainder of the solvent was added while the milling process occurred in order to further dilute and disperse the solution.

Example 5

CG300X in Glycerol

In this procedure, 0.25 grams of CG300X CNTs were mixed with 49.75 grams of glycerol (Aldrich, St. Louis, Mo.). The CNTs were wetted with the solvent and placed in an Exact 3-roll mill as a paste. The remainder of the solvent was added while the milling process occurred in order to further dilute and disperse the solution.

Example 6

CG300X in Ethylene Glycol

In this Example, 0.25 grams of CG300X CNTs were mixed with 49.75 grams of ethylene glycol (Aldrich, St. Louis, Mo.). The CNTs were wetted with the solvent and placed in an Exact 3-roll mill as a paste. The remainder of the solvent was added while the milling process occurred in order to further dilute and disperse the solution.

Example 7

TWNT in 2-Methyl-1,3-Propanediol

In this procedure, 0.25 grams of TWNT CNTs (Cheap Tubes, Inc., Brattleboro, Vt.) were mixed with 49.75 grams of 2-methyl-1,3-propanediol. The CNTs were wetted with the solvent and placed in an Exact 3-roll mill as a paste. The remainder of the solvent was added while the milling process occurred in order to further dilute and disperse the solution.

Example 8

CCNI22 in 2-Methyl-1,3-Propanediol

In this Example, 0.25 grams of XBC22 CNTs (CCNI, San Jose, Calif.) were mixed with 49.75 grams of 2-methyl-1,3-propanediol. The CNTs were wetted with the solvent and placed in an Exact 3-roll mill as a paste. The remainder of the solvent was added while the milling process occurred in order to further dilute and disperse the solution.

Example 9

CCNI33 in 2-Methyl-1,3-Propanediol

In this procedure, 0.25 grams of XBC33 CNTs (CCNI, San Jose, Calif.) were mixed with 49.75 grams of 2-methyl-1,3-propanediol. The CNTs were wetted with the solvent and placed in an Exact 3-roll mill as a paste. The remainder of the solvent was added while the milling process occurred in order to further dilute and disperse the solution.

Example 10

1% CG300X in 2-Methyl-1,3-Propanediol

In this Example, 0.5 grams of CG300X CNTs were mixed with 49.5 grams of 2-methyl-1,3-propanediol. The CNTs were wetted with the solvent and placed in an Exact 3-roll mill as a paste. The remainder of the solvent was added while the milling process occurred in order to further dilute and disperse the solution.

Example 11

0.1% CG300X in 2-Methyl-1,3-Propanediol

The stock solution from Example 9 was further diluted with 2-methyl-1,3-propanediol in an Exact 3-roll mill to form a 0.1% weight solution of CG300X CNTs in solvent.

Example 12

0.05% CG300X in 2-Methyl-1,3-Propanediol

The stock solution from Example 9 was further diluted with 2-methyl-1,3-propanediol in an Exact 3-roll mill to form a 0.05% weight solution of CG300X CNTs in solvent.

Example 13

SMW200X in 1,2-Propanediol

In this procedure, 0.5 grams of SMW200X CNTs (SWeNT, Norman, Okla.) were mixed with 37.13 grams of 1,2-propanediol (Aldrich, St. Louis, Mo.) and 12.38 grams of propylene glycol n-propyl ether (PnP) (Aldrich, St. Louis, Mo.). The CNTs were wetted with the solvent and placed in an Exact 3-roll mill as a paste. The remainder of the solvent was added while the milling process occurred in order to further dilute and disperse the solution.

Example 14

SMW200x in 1,2-Propanediol

In this Example, 0.5 grams of SMW200X CNTs (SWeNT, Norman, Okla.) were mixed with 24.75 grams of 1,2-propanediol (Aldrich, St. Louis, Mo.) and 24.75 grams of propylene glycol n-propyl ether (PnP) (Aldrich, St. Louis, Mo.). The CNTs were wetted with the solvent and placed in an Exact 3-roll mill as a paste. The remainder of the solvent was added while the milling process occurred in order to further dilute and disperse the solution.

Example 15

CG300X in 2-Methyl-1,3-Propanediol and 1,2-Propanediol

In this procedure, 0.75 grams of CG300X CNTs were mixed with 24.8 grams of 2-methyl-1,3-propanediol and 74.45 grams of 1,2-propanediol. The CNTs were wetted with the solvent and placed in an Exact 3-roll mill as a paste. The remainder of the solvent was added while the milling process occurred in order to further dilute and disperse the solution.

Example 16

Resistance Testing of Various CNT Printings

Some solutions from Examples 1-14 were screen printed onto various substrates using an Atma AT-70TD screen printer and heated in a HIX convection oven. ST 579 and ST 505 are Melinex® polyester films (DuPont Teijin), while Teonex is a polyethylene naphthalene film (DuPont Teijin).

Table 1 shows the resistance measurements and transmittance measurements of two different sheets for each CNT formulation. Resistance was measured using a Miller FPT-5000 4-point probe and transmittance was measured at 550 nm using a UV-Vis spectrometer.

TABLE 1

| | Substrate | | | | | | | |
|---|---|---|---|---|---|---|---|---|
| | ST 579 | | ST 505 | | Teonex | | Paper | |
| | SR ($\Omega$/sq) | % T | SR ($\Omega$/sq) | % T | SR ($\Omega$/sq) | % T | SR ($\Omega$/sq) | % T |
| Ex. 1 | 1368 | 78 | 5687 | 70 | 6238 | 80 | 872 | n/a |
| Ex. 2 | | | 26442 | 92.5 | | | | |
| Ex. 4 | | | 385 | 68.3 | | | | |
| Ex. 7 | 86875 | 88 | 7998 | 74 | n/a | 89 | 14187 | n/a |
| Ex. 8 | 2284 | 73 | 13238 | 89 | 59105 | 84 | 1086 | n/a |
| Ex. 9 | 10487 | 80 | 8007 | 83 | 150567 | 86 | 1062 | n/a |
| Ex. 10 | 137 | 38 | 119 | 36 | 189 | 37 | 62 | n/a |
| Ex. 11 | 6210 | 88 | 9165 | 90 | 5635 | 92 | 8003 | n/a |
| Ex. 12 | 34225 | 97 | 34975 | 95 | 177850 | 95 | n/a | n/a |
| Ex. 13 | 133.3 | | | | | | | |
| Ex. 14 | 112.9 | | | | | | | |

I claim:

1. A dispersion in the form of a film on a substrate, said dispersion comprising carbon nanotubes mixed with a $C_2$-$C_6$ multifunctional alcohol, wherein:
    said carbon nanotubes are selected from the group consisting of pristine carbon nanotubes, carbon nanotubes which have been functionalized with one or more polyaromatic moieties, and combinations thereof;
    said dispersion is free of surfactants; and
    said multifunctional alcohol is present in said dispersion in an amount of from about 90% to 99.999% by weight, based upon the total weight of the dispersion taken as 100% by weight.

2. The dispersion of claim 1, wherein said multifunctional alcohol is selected from the group consisting of diols and triols.

3. The dispersion of claim 1, wherein said multifunctional alcohol is selected from the group consisting of 2-methyl-1,3-propanediol, 1,2-propanediol, 1,3-propanediol, glycerol, and ethylene glycol.

4. The dispersion of claim 1, having a carbon nanotube concentration of from about 0.01% to about 5% by weight, based upon the total weight of the dispersion taken as 100% by weight.

5. The dispersion of claim 1, further comprising a solvent other than a multifunctional alcohol in said dispersion.

6. The dispersion of claim 1, said dispersion being formable into a film having a sheet resistance of less than about 7,000 $\Omega$/sq at 85% T.

7. The dispersion of claim 1 wherein said carbon nanotubes are selected from the group consisting of single-walled, double-walled, and multi-walled carbon nanotubes.

8. The dispersion of claim 1, wherein said one or more polyaromatic moieties are selected from the group consisting of naphthalene, anthracene, phenanthracene, pyrene, tetracene, tetraphene, chrysene, triphenylene, pentacene, pentaphene, perylene, benzo[a]pyrene, coronene, antanthrene, corannulene, ovalene, graphene, fullerene, cycloparaphenylene, polyparaphenylene, and cyclophene.

9. The dispersion of claim 1, wherein said substrate is selected from the group consisting of polyethylene terephthalate, polyimide, FR-4, breadboard, poly(methyl methacrylate), polyacrylate, epoxy, polyurethane, paper, polyester, polyethylene, silicon, SiGe, $SiO_2$, $Si_3N_4$, aluminum, tungsten, tungsten silicide, gallium arsenide, germanium, tantalum, tantalum nitride, coral, black diamond, sapphire, phosphorous or boron doped glass, ion implant layers, titanium nitride, hafnium oxide, silicon oxynitride, and mixtures of the foregoing.

10. A method of preparing a carbon nanotube film, said method comprising:
  providing a dispersion comprising carbon nanotubes mixed with a $C_2$-$C_6$ multifunctional alcohol, wherein:
    said dispersion is free of surfactants;
    said $C_2$-$C_6$ multifunctional alcohol is present in said dispersion in an amount of from about 90% to about 99.999% by weight, based upon the total weight of the dispersion taken as 100% by weight; and
    said carbon nanotubes are selected from the group consisting of pristine carbon nanotubes, carbon nanotubes which have been functionalized with one or more polyaromatic moieties, and combinations thereof; and
  forming said dispersion into a film on a substrate.

11. The method of claim 10, wherein said substrate is selected from the group consisting of polyethylene terephthalate, polyimide, FR-4, breadboard, poly(methyl methacrylate), polyacrylate, epoxy, polyurethane, paper, polyester, polyethylene, silicon, SiGe, $SiO_2$, $Si_3N_4$, aluminum, tungsten, tungsten silicide, gallium arsenide, germanium, tantalum, tantalum nitride, coral, black diamond, sapphire, phosphorous or boron doped glass, ion implant layers, titanium nitride, hafnium oxide, silicon oxynitride, and mixtures of the foregoing.

12. The method of claim 10, wherein said dispersion is formed by mixing carbon nanotubes with the multifunctional alcohol in a roll mill.

13. The method of claim 10, wherein said film is formed by screen printing said dispersion onto said substrate.

14. The method of claim 10, further comprising heating said film.

15. The method of claim 14, wherein said heating is carried out at a temperature of from about 50° C. to about 450° C.

16. The method of claim 14, wherein said heating causes substantially all of said multifunctional alcohol to evaporate from said film.

17. The method of claim 14, said film having a sheet resistance of less than about 7,000 Ω/sq at 85% T.

18. The method of claim 10, wherein said carbon nanotubes are selected from the group consisting of single-walled, double-walled, and multi-walled carbon nanotubes.

19. The method of claim 10, said dispersion further comprising a solvent other than a multifunctional alcohol in said dispersion.

20. A dispersion comprising carbon nanotubes mixed with a $C_2$-$C_6$ multifunctional alcohol, said dispersion:
  being formable into a film having a sheet resistance of less than about 7,000 Ω/sq at 85% T;
  having a carbon nanotube concentration of from about 0.01% to about 5% by weight, based upon the total weight of the dispersion taken as 100% by weight;
  having a multifunctional alcohol concentration of from about 90% to about 99.999% by weight, based upon the total weight of the dispersion taken as 100% by weight; and
  being free of surfactants.

21. The dispersion of claim 20, wherein said multifunctional alcohol is selected from the group consisting of 2-methyl-1,3-propanediol, 1,2-propanediol, 1,3-propanediol, glycerol, and ethylene glycol.

22. The dispersion of claim 20, said carbon nanotubes being noncovalently bonded to compounds comprising respective polyaromatic moieties, wherein at least some of said polyaromatic moieties being reacted with an acid and wherein said compound comprising a polyaromatic moiety is selected from the group consisting of substituted and unsubstituted compounds selected from the group consisting of naphthalene, anthracene, phenanthracene, pyrene, tetracene, tetraphene, chrysene, triphenylene, pentacene, pentaphene, perylene, benzo[a]pyrene, coronene, antanthrene, corannulene, ovalene, graphene, fullerene, cycloparaphenylene, polyparaphenylene, cyclophene, and compounds containing moieties of the foregoing.

23. The dispersion of claim 20, wherein said carbon nanotubes are selected from the group consisting of single-walled, double-walled, and multi-walled carbon nanotubes.

24. The dispersion of claim 20, wherein said dispersion is in the form of a film on a substrate selected from the group consisting of polyethylene terephthalate, polyimide, FR-4, breadboard, poly(methyl methacrylate), polyacrylate, epoxy, polyurethane, paper, polyester, polyethylene, silicon, SiGe, $SiO_2$, $Si_3N_4$, aluminum, tungsten, tungsten silicide, gallium arsenide, germanium, tantalum, tantalum nitride, coral, black diamond, sapphire, phosphorous or boron doped glass, ion implant layers, titanium nitride, hafnium oxide, silicon oxynitride, and mixtures of the foregoing.

* * * * *